Dec. 15, 1925.  1,565,660

M. L. LITTLE

AUTO HOOD LAMP

Filed June 29, 1925

Inventor
Mary L. Little
By R. S. Berry
Attorney

Patented Dec. 15, 1925.

1,565,660

UNITED STATES PATENT OFFICE.

MARY L. LITTLE, OF LONG BEACH, CALIFORNIA.

AUTO HOOD LAMP.

Application filed June 29, 1925. Serial No. 40,235.

*To all whom it may concern:*

Be it known that I, MARY L. LITTLE, a citizen of the United States, residing at Long Beach, in the county of Los Angeles and State of California, have invented new and useful Improvements in Auto Hood Lamps, of which the following is a specification.

My invention particularly pertains to a device illuminating the interior of the hood of a motor vehicle and especially relates to improvements in the device set forth in my co-pending application filed October 29, 1923, Serial No. 671,544.

An object of my invention is to provide a lamp and a mounting therefor which may be readily positioned within the space enclosed by the hood of a motor vehicle so as to afford illumination of the engine and associated parts located in the hood, and thereby enable the making of adjustments and minor repairs of the engine mechanism at night without necessitating the use of flash lights, and the like.

Another object is to provide a means whereby an electric lamp may be disposed so as to illuminate the interior of the engine hood and to emit light rays through openings in the hood and through the air passages of the radiator so as to render the front portion of the vehicle visible in the dark from in front, and from either side, without the use of headlights, which is especially advantageous when the vehicle is parked or standing in a roadway at night.

A further object is to provide a lamp of the above character which is simple in construction and adapted to be readily removed and replaced.

Another object is to provide a lamp structure for the purpose set forth embodying a pair of light elements so mounted and arranged that when the lamp structure is located in the hood of a motor vehicle both sides of the engine will be illuminated and another object is to provide a construction whereby the pair of light elements may be separated and used independently of each other as portable emergency lamps.

With the foregoing objects in view, together with such other objects and advantages as may subsequently appear, my invention resides in the parts and in the combination, construction and arrangement of parts hereinafter described and claimed, and illustrated in the accompanying drawings, in which:—

Figure 1:
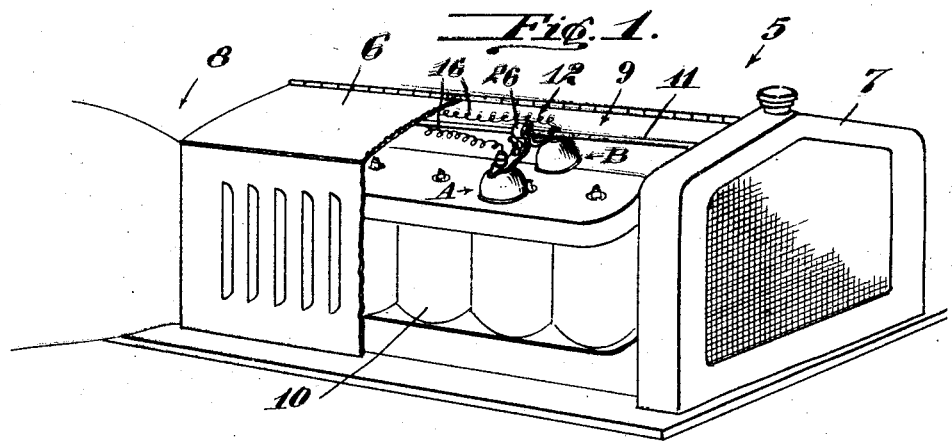
Fig. 1 is a perspective view of the hood portion of a motor vehicle with portions broken away, showing the invention as applied.

Referring to the drawings more specifically, 5 indicates the hood portion of a motor vehicle which embodies a hood 6 extending between the radiator 7 and the vehicle body 8; the hood enclosing a space 9 in which is supported the engine 10 and its associated parts as is common in motor vehicle construction.

Extending between the radiator 7 and the vehicle body 8, above the engine 10 is a horizontally disposed tie rod 11 which I employ as a means for supporting my lamp structure which structure embodies a pair of light elements A and B, here shown as comprising ordinary electric lamps and as embodying reflectors 13 and electric lighting bulbs 14. The bulbs 14 are mounted in sockets indicated at 15 in the usual manner and are connected into the vehicle lighting circuit through the medium of conductors 16.

In carrying out my invention I provide a pair of brackets 17 and 17' each of which embodies a horizontally extending shank 18 one end of which is formed with a collar 19 surrounding an opening 20 adapted to receive an annuar flange 21 formed on the reflector 13 and in which flange is supported the socket member 15; the reflector 13 being arranged to depend from the underside of the bracket and being secured to the latter by means of a rivet 22 or similar fastening which connects an apertured ear 23 on the collar 19 with the hood, whereby the latter is securely affixed to the bracket. The electrical conductor 16 connects with the socket 15 through a common form of connection indicated generally at 24.

Figure 2:
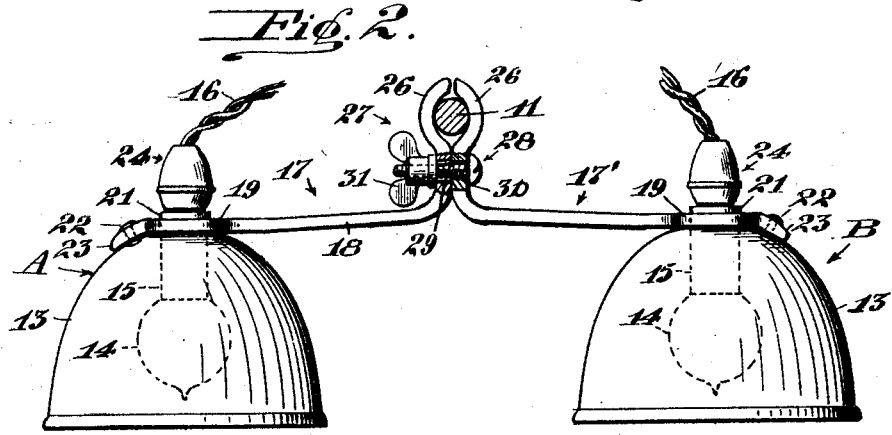
Fig. 2 is a view in elevation of the lamps showing the manner of mounting same.
Figure 3:
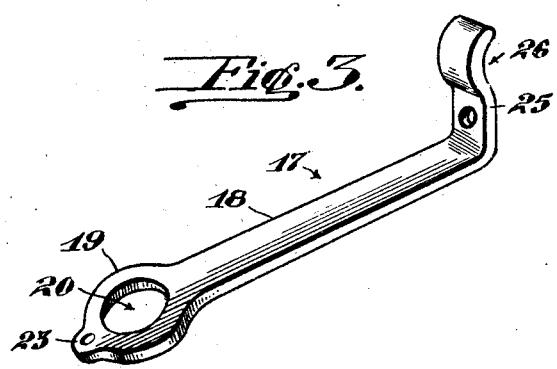
Fig. 3 is a perspective view of one of the demountable lamp brackets.

The inner end portion of the shank 18 of each bracket is turned upwardly as indicated at 25 and terminates in a curved jaw portion 26 adapted to engage the side of the bar or tie rod 11 as shown in Fig. 2; the jaw members 26 on the brackets 17 and 17' respectively, being clamped in engagement with the tie rod 11 by means of a clamping device 27, here shown as comprising a screw 28 which is passed through openings 29 formed in the portions 25 of the brackets 17 and 17′ and which screw has threaded engagement with the walls of one of the openings 29, as indicated at 30 in Fig. 2, whereby the screw is securely held and carried by one of the bracket members with the threaded portion of the screw. The screw is longitudinally slidable through the opening 29 in the other bracket member and is fitted with a nut 31 adapted on being tightened on the screw 28 to clamp the jaws 26 on the bar 11.

When the brackets 17 and 17′ are thus mounted on the tie rod 11 they will be pinned therebeneath with the shanks 18 extending in opposite directions transversely of the bar 11 and will be held in spaced relation to the rod 11 in demountable engagement therewith.

I claim:—

1. In an auto hood lamp, a pair of complementary brackets, adapted to be placed end to end and having their meeting ends upturned and forming collectively a pair of jaw members, clamping means connecting the upturned end portions of said bracket, and a lamp carried on the outer ends of each of said brackets.

2. In an auto hood lamp, a pair of bracket members, each of which is formed with an upturned end portion forming a jaw member, said upturned end portion being apertured, means extending through the apertures in said end portions adapted to clamp said end portions together, and a lamp carried on the outer end of each of said brackets.

3. In an auto hood lamp, a bracket comprising a shank having an upturned inner end portion formed with a jaw member, and provided with an apertured outer end portion, a lamp reflector affixed to said outer end portion, a lamp socket in said reflector leading through the aperture in said outer end portion, a second jaw member cooperating with the jaw member on the inner portion of the shank, and means for clamping said jaw members together.

In testimony whereof I have affixed my signature.

MARY L. LITTLE.